United States Patent Office 2,706,469
Patented Apr. 19, 1955

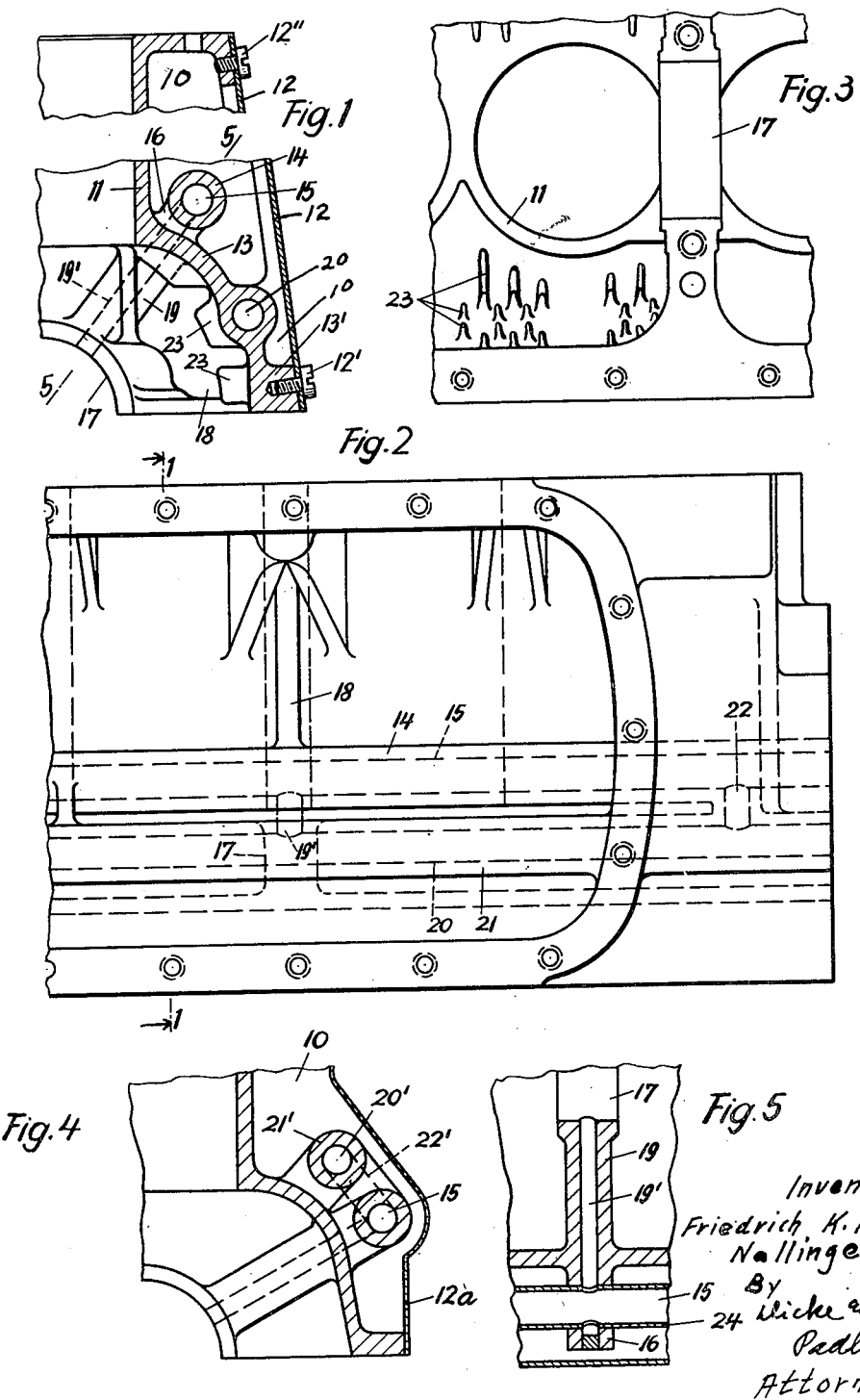

2,706,469

DEVICE FOR THE COOLING OF LUBRICANTS IN INTERNAL COMBUSTION ENGINES

Friedrich K. H. Nallinger, Stuttgart, Germany, assignor to Daimler-Benz Aktiengesellschaft, Stuttgart-Unterturkheim, Germany Application May 14, 1951, Serial No. 226,188

Claims priority, application Germany May 13, 1950

9 Claims. (Cl. 123—41.33)

This invention relates to a device for the cooling of lubricants in internal combustion engines, and it is an object of the invention to provide a cooling device that effects an especially effective cooling of the lubricants, particularly the lubricating oil for cooling and lubricating the crankshaft bearings.

An essential feature of the invention consists therein that for supplying or distributing the lubricating oil an essentially freely exposed and preferably longitudinally extending oil line is provided within the coolant jacket of the internal combustion engine, the coolant jacket being suitably constructed as cooling-water jacket that surrounds the crankcase directly.

An important object of the invention is to subject the lubricating oil flowing to the crankshaft bearings over essentially the entire length of said oil line to the direct influence of the cooling water. Conducting the cooling water through the lower part of the cooling-water jacket, particularly that part surrounding the crankshaft casing, will cause the lubricant to be subjected to the effect of the coolant which has not yet been heated, or not much heated, so that a very effective heat exchange with the cooling water may take place. At the same time the lubricanting oil having been thrown against the cylinder walls by the crankshaft and then flowing back to the oil pan is subjected to another effective cooling if the coolant jacket also cools the crankcase directly. Owing to the improved cooling of the lubricating oil the reliability in operation of the engine is substantially improved and its power substantially increased.

According to another feature of the invention, the oil lines may be cast integrally with the casing, or they may consist of fitted or cast-on pipes. According to a further feature of the invention several oil lines are provided instead of a single oil line conducting the lubricating oil through the cooling-water jacket and distributing it to the crankshaft bearings. These oil lines suitably are arranged parallel to each other and, for example, connected in series one after another.

Another object of the invention is the provision of a closure for the cooling-water jacket so that it may be closed, for example, by a subsequently welded on, or removable sheet-metal hood for convenient access to the interior of the cooling-water jacket, for example, for such purposes as mounting or dismounting the lubricating oil cooling unit, or for drilling the holes for the oil supply line to the bearings and the like.

In the accompanying drawings several forms of the invention are illustrated diagrammatically by way of example.

In said drawings:

Fig. 1 is a sectional view taken in the plane of the line 1—1 in Fig. 2 showing the construction of a cylinder housing for an internal combustion engine (with integrally cast lubricating oil supply line), Fig. 2 a side view of the engine housing, Fig. 3 a plan view of the same seen from below, Fig. 4 is a sectional view similar to that of Fig. 1 through another form of the invention, and Fig. 5 is a sectional view taken in the plane of the line 5—5 in Fig. 1 (with installed lubricating oil line).

In the form of the invention according to Figs. 1–3 the cooling-water jacket 10 is formed by the cast housing 11 of the internal combustion engine and by a sheet-metal jacket 12, the latter being rigidly or removably attached to said housing 11, for example, by screws 12', 12". The cooling-water jacket 10 also extends over the crankcase 13 down to the lower flange 13' at the level of the crankshaft center.

Within the cooling-water jacket is arranged a pipe comprising respectively a bar-like member 14 having a through bore and forming a duct 15 extending along the engine and being connected to the crankcase 13 by several lugs 16, the pipe 14 being cast integrally with the housing. The lugs 16 are, particularly as shown in Fig. 2, arranged in the plane of the crankshaft bearings 17 and supporting walls 18 for the bearings and extend, as indicated at 19, up to the bearings 17. Bores 19' extending through the lugs 16 and supporting walls 18 of the crankshaft bearings connect the longitudinal duct 15 with the surface of the bearing 17 and serve as supply lines for supplying lubricating oil to these bearings.

Parallel to the longitudinal duct 15 for distributing the lubricating oil to the main bearings, there is provided a further parallel arranged duct 20 which is formed by a bore in a housing lug 21 and likewise may serve for conducting and cooling the lubricating oil. Both ducts are connected in parallel or in series one after another to the lubricating oil supply line, for example, in such a manner that at first the lubricating oil is delivered from any suitable point, for example, from the ends or from the center part of the longitudinal pipe to the oil line 20, where it is pre-cooled and then conducted through the cross bore 22 to the distributing duct 15. If necessary, the lubricating oil which has been partly cooled in the cross bore 22 may at first be conducted through a filter or the like before it reaches the distributing duct 15.

In addition, the crankcase 13 on its inside is provided with a great number of cooling fins or other projections 23 for enlarging the cooling surface and insuring a thorough heat exchange between coolant and lubricant at the point of location of the line 20.

In the form of the invention according to Fig. 4 the line 20' being parallel to the line 15 is freely arranged with the cylindrical part 21' (cast integrally with the housing) within the coolant space, the connection to the duct 15 being established through a cross bore 22'. In this case the cooling-water jacket is closed by a sheet-metal plate 12a which, for the purpose of reducing the cooling-jacket space, is appropriately bulged to correspond to the shape of the casting. It may be rigidly secured to the housing, for example, by welding, soldering or the like, or it may be removably attached to it.

Alternatively the oil duct 20 or 20' respectively may be omitted. In such a case the lubricating oil is conveyed, for example, by the lubricating oil pump directly to the duct 15, for example, either from the center or from one end. It stands to reason that instead of two oil lines there might be provided two or more longitudinal oil lines.

In the embodiment of the invention according to Fig. 5, the oil pipe for the longitudinal duct 15, instead of being cast-on, is formed from a pipe 24 which is fitted into the lugs 16 respectively cast integrally with them. The fitted pipe or pipes (24 etc.) may be made from steel or brass tubing, or from any suitable material.

It will now be observed that the invention provides for a very effective cooling of the lubricant by the employment of lubricating ducts which are immersed in the coolant and due to the relatively strong oil current assisted, if desired, by the cooling fins. Practically the machining of the castings, as compared with the usual construction, does not require any additional labor worth mentioning. In the case of several longitudinal ducts, the bores may be formed simultaneously. In addition, other supply lines to other oiling points such as camshaft bearings and the like may branch-off from the previously described oil lines and eventually may be installed in corresponding manner within the cooling-water jacket.

It will be obvious that the details of construction may be varied from those shown in the drawings. I therefore do not limit myself to such details.

What is claimed is:

1. Device for the cooling and distribution of lubricants in internal combustion engines comprising an internal combustion engine housing having main bearings for the crankshaft, a cooling jacket for said housing, a longitudinally extending lubricating oil line within said cooling jacket and bathed by the coolant, separate branch lines extending from said longitudinal line for conducting the lubricant directly to the main bearings of the engine.

2. Device for the cooling of lubricants in internal combustion engines comprising an internal combustion engine housing including a cylinder, a crank case and a cooling jacket formed at least in part by a wall extending from the cylinder towards and near a plane extending through the axis of the crankshaft and being substantially perpendicular to the cylinder axis so as to surround at least a substantial part of said crank case for simultaneously cooling said crank case and said cylinder by the cooling medium in said cooling jacket, and a lubricating oil conduit within said cooling jacket on the outside of said wall and bathed by the cooling medium within said cooling jacket.

3. The combination according to claim 2, wherein said crank case is provided with crankshaft bearings, and wherein said lubricating conduit extends essentially in the longitudinal direction of the engine, and branch lines for conducting the lubricant from said longitudinal conduit to said crankshaft bearings.

4. Device for the cooling and distribution of lubricants in internal combustion engines comprising an internal combustion engine housing including a wall forming at least part of the cylinder walls and part of the cooling jacket, a lubricating oil line within said cooling jacket on the outside of said wall and extending longitudinally of the engine, a second lubricating oil line on the outside of said wall and arranged parallel to said first-mentioned lubricating oil line, branch lines for distributing the lubricant to the lubricating points of the engine, means for connecting said parallel lubricating oil lines, said means being adapted to conduct lubricant at first to said first mentioned lubricating oil line and then to said lubricating oil line arranged parallel thereto and then to the lubricating points.

5. Device for the cooling and distribution of lubricants in internal combustion engines comprising an internal combustion engine housing having lubricating points and a cooling jacket formed in part at least by said housing, lugs formed integrally with said housing and extending into said cooling jacket, a lubricating oil line formed into said lugs and extending longitudinally of the engine, said lubricating oil line being exposed freely in said cooling jacket between said lugs to be bathed by the coolant in said cooling jacket.

6. Device for the cooling of lubricants in internal combustion engines comprising an internal combustion engine housing including a crankcase with a cooling jacket surrounding at least part of the crankcase for cooling the same, and a lubricating oil conduit within said cooling jacket and adapted to be bathed by cooling medium within said cooling jacket, said crankcase being formed with internal cooling fins in the area of the cooling jacket.

7. Device according to claim 1 wherein said housing is provided with lugs adjacent to the main bearings, said lugs extending into said cooling jacket, and said longitudinally extending lubricating oil line being connected to said housing essentially only by said lugs.

8. Device for the cooling and distribution of lubricants in internal combustion engines comprising an internal combustion engine crankcase having several main bearings for the crankshaft and a cooling jacket surrounding at least part of the crankcase for cooling the same, a lubricating oil line within said cooling jacket and bathed by cooling medium therein, branch lines for distributing lubricant from said lubricating oil line to said main bearings, and cooling fins on said crankcase.

9. Device according to claim 8 in combination with a second lubricating oil line arranged in contiguity with said cooling jacket parallel with said first mentioned lubricating line, and means for conducting lubricant through both of said lines.

References Cited in the file of this patent

UNITED STATES PATENTS

| | | |
|---|---|---|
| 1,713,541 | Larkin | May 21, 1921 |
| 1,846,268 | McCuen | Feb. 23, 1932 |
| 1,963,172 | Meyer | June 19, 1934 |
| 2,254,439 | McCarthy | Sept. 2, 1941 |
| 2,338,084 | Edmunds | Jan. 4, 1944 |

FOREIGN PATENTS

| | | |
|---|---|---|
| 327,791 | Great Britain | Apr. 17, 1930 |